United States Patent
Osinski et al.

(10) Patent No.: US 9,644,141 B2
(45) Date of Patent: May 9, 2017

(54) HALIDE-BASED SCINTILLATOR NANOMATERIAL

(71) Applicants: Marek A. Osinski, Albuquerque, NM (US); Nathan J. Withers, Albuquerque, NM (US); Brian A. Akins, Edgewood, NM (US); Gennady A. Smolyakov, Albuquerque, NM (US); Krishnaprasad Sankar, Hillsboro, OR (US)

(72) Inventors: Marek A. Osinski, Albuquerque, NM (US); Nathan J. Withers, Albuquerque, NM (US); Brian A. Akins, Edgewood, NM (US); Gennady A. Smolyakov, Albuquerque, NM (US); Krishnaprasad Sankar, Hillsboro, OR (US)

(73) Assignee: STC.UNM, Albuquerque, NM (US)

( * ) Notice: Subject to any disclaimer, the term of this patent is extended or adjusted under 35 U.S.C. 154(b) by 595 days.

(21) Appl. No.: 13/986,039

(22) Filed: Mar. 26, 2013

(65) Prior Publication Data
US 2013/0299720 A1 Nov. 14, 2013

Related U.S. Application Data

(60) Division of application No. 12/386,503, filed on Apr. 17, 2009, now Pat. No. 8,431,041, and a
(Continued)

(51) Int. Cl.
C09K 11/77 (2006.01)
C09K 11/66 (2006.01)
(Continued)

(52) U.S. Cl.
CPC ........ *C09K 11/7773* (2013.01); *C09K 11/664* (2013.01); *C09K 11/7772* (2013.01);
(Continued)

(58) Field of Classification Search
CPC ... C09K 11/61–11/618; C09K 11/0827; C09K 11/0833; C09K 11/626;
(Continued)

(56) References Cited

U.S. PATENT DOCUMENTS 3,623,907 A * 11/1971 Watts ............................ 428/450
5,360,578 A * 11/1994 Leblans et al. ......... 252/301.4 H
(Continued)

OTHER PUBLICATIONS

Llfshitz. Photodecomposition and Regeneration of PbI2 nanometer-sized particles, embedded in porous silica films. j. phs. chem. 1995, 99, 1245-1250.
(Continued)

*Primary Examiner* — Matthew E Hoban

(57) ABSTRACT

A heterogeneous scintillator material is provided comprising core/shell nanoparticles having a highly hygroscopic or deliquescent halide-based core activated with trivalent $Ln^{3+}$ or divalent $Ln^{2+}$ lanthanide ions (Ln=La, Ce, Pr, Nd, Pm, Sm, Eu, Gd, Tb, Dy, Ho, Er, Tm, Yb, Lu) and a stable non-hygroscopic shell thereon. The heterogeneous nanoparticles can comprise highly hygroscopic lanthanide halide ($LaBr_3$, $LuI_3$) cores protected with stable non-hygroscopic $LaF_3$ shells. The heterogeneous nanoparticles can comprise deliquescent alkaline earth halide ($SrI_2$, $BaI_2$) cores protected with stable non-hygroscopic ($SrF_2$, $BaF_2$) shells.

9 Claims, 8 Drawing Sheets

Related U.S. Application Data continuation-in-part of application No. 12/383,953, filed on Mar. 30, 2009, now abandoned.

(60) Provisional application No. 61/072,636, filed on Mar. 31, 2008, provisional application No. 61/046,035, filed on Apr. 18, 2008.

(51) Int. Cl.
  *G01T 1/202* (2006.01)
  *G01T 1/20* (2006.01)

(52) U.S. Cl.
  CPC ............... *G01T 1/20* (2013.01); *G01T 1/202* (2013.01); *Y10T 428/256* (2015.01); *Y10T 428/2982* (2015.01)

(58) Field of Classification Search
  CPC ... C09K 11/628; C09K 11/632; C09K 11/634; C09K 11/644; C09K 11/645; C09K 11/674; C09K 11/675; C09K 11/696; C09K 11/705; C09K 11/712; C09K 11/72; C09K 11/722; C09K 11/725; C09K 11/727; C09K 11/7428; C09K 11/7435; C09K 11/755; C09K 11/756; C09K 11/7704; C09K 11/7705; C09K 11/7719; C09K 11/772; C09K 11/7732; C09K 11/7733; C09K 11/7747; C09K 11/7748; C09K 11/7757; C09K 11/7762; C09K 11/7763; C09K 11/777; C09K 11/7772; C09K 11/7773; C09K 11/7788; C09K 11/779; C09K 11/791; C09K 11/895; C09K 11/897
  USPC .................................................. 252/301.4 H
  See application file for complete search history.

(56) References Cited

U.S. PATENT DOCUMENTS

| | | | |
|---|---|---|---|
| 5,639,400 A * | 6/1997 | Roberts et al. .......... | 252/301.36 |
| 6,855,270 B2 | 2/2005 | Mumper et al. ......... | 252/301.17 |
| 7,105,832 B2 | 9/2006 | Dai et al. ................. | 250/390.11 |
| 7,449,128 B2 | 11/2008 | Krishna et al. ........... | 252/301.4 |
| 7,625,502 B2 * | 12/2009 | Clothier et al. ....... | 252/301.4 H |
| 2006/0054863 A1 | 3/2006 | Dai et al. .................... | 252/301.4 |
| 2007/0063154 A1 | 3/2007 | Chen et al. ................ | 250/483.1 |
| 2007/0085010 A1 | 4/2007 | Letant et al. ............... | 250/361 |
| 2007/0122543 A1 | 5/2007 | Yanoff et al. .................. | 427/64 |
| 2008/0011956 A1 * | 1/2008 | Burrell et al. ............... | 250/367 |
| 2008/0090716 A1 | 4/2008 | Cherepy et al. .............. | 501/12 |
| 2008/0093557 A1 | 4/2008 | Cooke et al. ................ | 250/361 |
| 2008/0128624 A1 | 6/2008 | Cooke et al. ................ | 250/361 |
| 2008/0191168 A1 | 8/2008 | McKigney et al. ...... | 252/301.18 |
| 2009/0081461 A1 * | 3/2009 | Yi et al. ........................ | 428/407 |

OTHER PUBLICATIONS

Balbarac. On the optical properties of micro- and nanometric size PbI2 particles. J Phys Condens. Matter 16 2004, 2345-2356.
M.J. Weber, Inorganic scintillators: today and tomorrow, Journal of Luminescence 100, 2002, pp. 35-45.
S. Dai, et al., Nanocrystal-based Scintillators for Radiation Detection, Chemical Sciences and Nuclear Science and Technology Divisions, Oak Ridge Laboratory, Oak Ridge, TN 37831, pp. 220-224.
S.E. Derenzo, et al., Temperature dependence of the fast, near-band-edge scintillation from CuI, HgI$_2$, PbI$_2$, ZnO:Ga and CdS:In, Nuclear Instruments and Methods in Physics Research A 486, 2002, pp. 214-219.
C.E. Finlayson and P.J.A. Sazio, Highly effective blue photoluminescence from colloidal lead-iodide nanoparticles, J. Phys. D: Appl. Phys. 39, 2006, pp. 1477-1480.
M. Klintenberg, et al., Potential scintillators identified by electronic structure calculations, Nuclear Instruments and Methods in Physics Research A 486, 2002, pp. 298-302.
M.K. Klintenberg, et al., Luminescence and scintillation of PbI$_2$ and HgI$_2$, Journal of Luminescence 102-103, 2003, pp. 287-290.
S.E. Létant and T.-F. Wang, Study of porous glass doped with quantum dots or laser dyes under alpha irradiation, Appl. Phys. Lett. 88, 103110, 2006.
S.E. Létant and T.-F. Wang, Semiconductor Quantum Dot Scintillation under γ-Ray Irradiation, Nano Letters, vol. 6, No. 12, 2006, pp. 2877-2880.
E.A. McKigney, et al., Nanocomposite scintillators for radiation detection and nuclear spectroscopy, Nuclear Instruments and Methods in Physics Research A 579, 2007, pp. 15-18.
E.V.D. van Loef, et al., High-energy-resolution scintillator: Ce$^{3+}$ activated LaBr$_3$, Appl. Phys. Lett. vol. 79, No. 10, 2001, pp. 1573-1575.

* cited by examiner

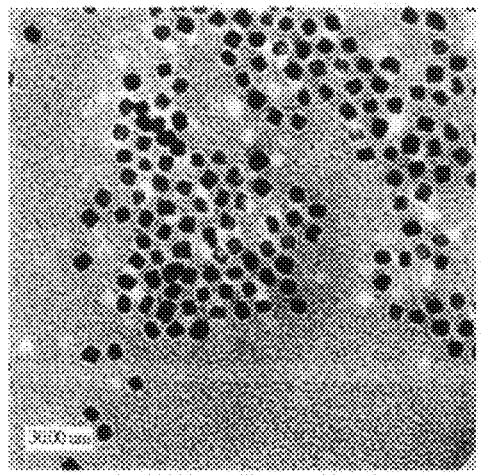 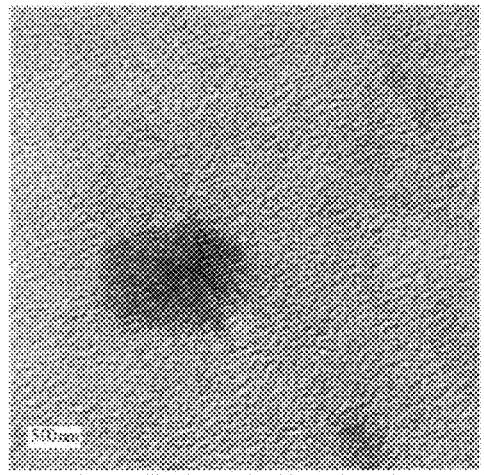
Fig. 1(a)  Fig. 1(b)
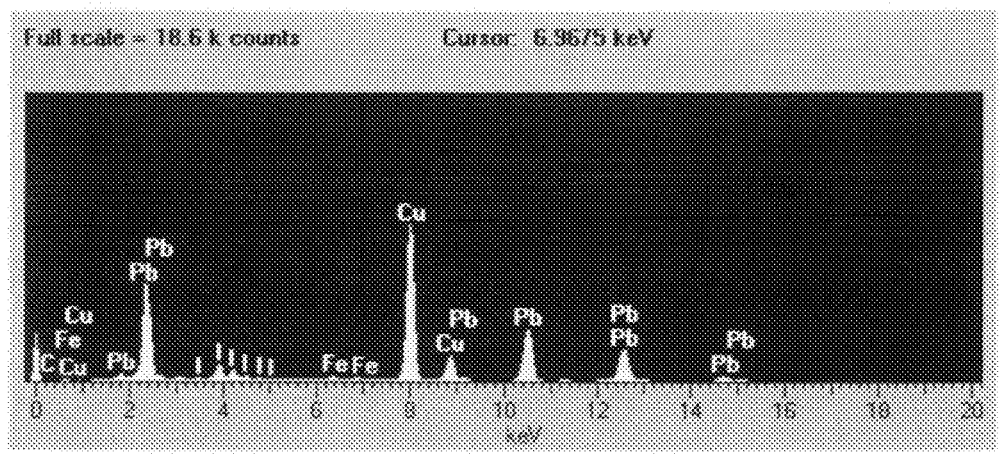
Fig. 2

HALIDE-BASED SCINTILLATOR NANOMATERIAL

RELATED APPLICATIONS

This application is a divisional of U.S. patent application Ser. No. 12/386,503 filed Apr. 17, 2009, which claims benefits and priority of provisional application Ser. No. 61/046,035 filed Apr. 18, 2008, and which is also a continuation-in-part of U.S. patent application Ser. No. 12/383,953 filed Mar. 30, 2009. U.S. patent application Ser. No. 12/383,953 claims benefits and priority of provisional application Ser. No. 61/072,636 filed Mar. 31, 2008. The disclosures of all of the prior applications are incorporated herein by reference.

CONTRACTUAL ORIGIN OF THE INVENTION

The invention was made with government support under Grants IIS-0610201 and CBET-0736241 awarded by the National. Science Foundation and under Grants DTRA01-03-D-0009 and HDTRA1-08-1-0021 awarded by the Department of Defense, Defense Threat Reduction Agency. The government has certain rights in the invention.

FIELD OF THE INVENTION

The present invention relates to a scintillator material comprising a halide-based material in a nanoparticle or microparticle morphology, including heterogeneous nanoparticles having core/shell morphology, wherein the scintillator material exhibits scintillation when exposed to gamma irradiation. The present invention relates to a scintillator material comprising a lead-iodide-based nanoparticle or microparticle material, and to a scintillator material comprising a lanthanide halide core/shell nanoparticle material, and to a scintillator material comprising alkaline earth halide core/shell nanoparticle material.

BACKGROUND OF THE INVENTION

Semiconductor nanocrystals (NCs) or quantum dots (QDs) have been extensively investigated over the last decade for a variety of biomedical, biochemical sensing, and optoelectronic applications. An area that has received relatively little attention so far is the use of NCs as gamma or X-ray detectors in applications such as positron emission tomography (PET), digital radiography, dosimetry, and nuclear medicine. In a typical radiation detection system, conversion of the incident energy of ionizing radiation is accomplished by using scintillating materials that emit photons in the visible/UV spectral range, subsequently collected by a photosensitive element.

Positron Emission Tomography:

Positron emission tomography (PET) is an imaging technique for tracking the bodily uptake of positron-emitting isotopes in two or three dimensions. The technique is currently used in medicine for the detection and analysis of cancerous tumors [Bangerter 1998], Alzheimer's disease [Matsunari 2007], and epilepsy [O'Brien 2001]. The first step in performing a PET scan is the synthesis of a positron-emitting material. A commonly used material is 2-[$^{18}$F]-fluoro-2-deoxy-d-glucose ($^{18}$F-FDG, FDG), where a hydroxyl group from glucose is replaced with fluorine-18, a synthetic positron-emitting isotope. FDG is absorbed by organs of the body as glucose, and is concentrated in high activity tissues in the body such as tumors and the brain.

Fluorine-18, which has a half-life of 109.77 minutes, emits a positron and decays into stable oxygen-18. The emitted positron travels a few millimeters in tissue before an electron annihilates it, and the product of this interaction is a pair of 0.511 MeV gamma rays traveling in opposite directions due to conservation of momentum [Knoll 2000]. The detection of these pairs of gamma rays is accomplished through a coincident scintillation event in a pair of detectors on opposite sides of the body.

When an event is detected, it signals that a positron-electron annihilation has occurred in a volume defined by the two detectors, and through statistical evaluation of many decays, tomographic reconstruction provides a two-dimensional or volumetric image of the locations of the events. In current systems, thousands of scintillation detectors are arranged around the patient, allowing for coincident detection of the two gamma rays resulting from positron-electron annihilation to minimize this volume, approaching the ray integral required for image reconstruction [Kalk 1998].

Potential Advantages of Nanocrystals in Time-of-Flight PET:

The signal-to-noise ratio of a tomographic image can be improved through time-of-flight methods [Wong 1983]. High-brightness high-speed scintillators, such as LYSO [Muzic 2006], allow for extraction of very small, on the order of picoseconds, differences in scintillation times to provide a spread function along the detection volume containing the location of the annihilation events. This additional information leads to a higher signal to noise ratio, lower doses of radioactive tracers, faster imaging, and increased resolution of the reconstructed image [Wong 1983]. Fast and efficient scintillators are therefore crucial for time-of-flight PET applications.

Commonly used extrinsic inorganic scintillators consist of a transparent insulator and an impurity functioning as a luminescence center. They are, in many cases, either slow or have low radiative efficiency. Indeed, in developing ultrafast scintillators, the luminescence via an intermediate excited state of an impurity is rather disadvantageous. Currently, the conventional cerium ($Ce^{3+}$)-activated inorganic scintillators provide the best combination of speed and efficiency. Cerium-doped bulk lanthanum halide compounds are attractive due to their interesting properties that include efficient radiation absorption, highly luminescent activator (cerium), activators protected by the host material from luminescence quenching, and fast decay time of radiative transitions between internal atomic levels of cerium (10-60 ns). Among a variety of Ce-doped bulk crystals that possess good scintillation detection properties, Ce-doped bulk $LaBr_3$ was reported to have a light yield of 60,000 photons/MeV, 2.5% full-width-to-half-maximum energy resolution for 662 keV γ rays, and 25 ns short decay time [Derenzo 2005]. Ce-doped bulk $LuI_3$ was reported to have a record high light yield of 95,000 photons/MeV, 3.3% full-width-to-half-maximum energy resolution for 662 keV γ rays, and 24 ns scintillation decay time for the dominant decay component [Kramer 2006]. Recently, very impressive scintillation properties have been reported for ($Eu^{2+}$)-activated alkaline earth halide $SrI_2$ and $BaI_2$ bulk materials [Cherepy 2008]. However, while having those attractive properties, $LuI_3$:Ce, $LaBr_3$:Ce, $SrI_2$:Eu, and $BaI_2$:Eu bulk crystals are expensive and difficult to manufacture and use. The crystals are highly hygroscopic or even deliquescent and very fragile, and hence have to be protected from external environment both during growth and use.

The radiative decay times of the conventional cerium ($Ce^{3+}$)-activated inorganic scintillators are limited to ~10-60 ns [van Loef 2001], [Weber 2002]. Direct excitonic luminescence from pure semiconductors in intrinsic inorganic scintillators could be employed by using the direct recombination of an electron and a hole with a decay time constant shorter than 10 ns. However, undoped semiconductors have rarely been used as scintillators, because of their poor luminescence efficiency at room temperature (RT). The excitonic level in a semiconductor is below the bottom of the conduction band by the binding energy $E_b$ of the exciton. In bulk semiconductors, the excitonic level is not deep enough to prevent the thermal dissociation of excitons, and, as a result, the significant thermal quenching of excitonic luminescence at RT. Recently, very fast and efficient performance has been demonstrated from pure semiconducting scintillators such as $PbI_2$ and $HgI_2$ at cryogenic temperatures [Klintenberg 2002], [Derenzo 2002], [Klintenberg 2003]. Cooling the system to very low temperatures increased the population of excitons rather than free carriers by effectively suppressing the thermal perturbations, proportional to the thermal energy $k_BT$.

Increasing the binding energy $E_b$ of the exciton to the values exceeding the thermal energy $k_BT$ at RT (~26 meV) is the requirement to thermally stabilize the excitonic level at RT. This can be realized by employing quantum confinement effect observed in low-dimensional quantum confinement systems (LD QCS). Enhancement of Coulomb interaction between the electron and hole due to spatial confinement is known to deepen the excitonic level in a low-dimensional system. For example, the binding energy of the lowest exciton confined in a two-dimensional (2D, quantum well) system is four times higher than that of the free exciton in the corresponding 3D bulk system [Papavassiliou 1997]. In addition to providing improved thermal stability of the excitonic population, quantum confinement affects the excitonic radiative and nonradiative lifetimes in a way that would further enhance the radiative efficiency. Due to much better overlapping of the electron and hole wavefunctions in a LD QCS, the excitonic oscillator strength increases and the excitonic radiative lifetime shortens [Amand 1992], [Xu 1993]. At the same time, the nonradiative lifetime lengthens due to a decrease in the effective density of nonradiative centers that can be encountered by the spatially confined excitons.

Nanoscintillators:

In contrast to ample literature on scintillators based on large-size crystals, there have been only a handful of reports on radiation response of colloidal NCs. The term "scintillation" is sometimes, perhaps confusedly, used to indicate wavelength conversion from UV to the visible [Mutlugun 2007]. Here, we consider scintillation to mean optical response (visible or UV) to ionizing radiation.

The first demonstration of NCs as scintillators for radiation detection was reported in [Dai 2002], where CdSe/ZnS core/shell colloidal QDs were used. The QDs were rendered water soluble by exchanging the surface ligands with dithiothreitol (DTT), added during the preparation of lithiated $^6LiOH$ gels, and embedded in a transparent sol-gel matrix. Using a standard setup with a photomultiplier tube (PMT), amplifier, and a multichannel board, scintillation was observed under a irradiation from a $^{210}Po$ source.

Commercial CdSe/ZnS colloidal QDs suspended in toluene were used in [Létant 2006a]. The QDs were inserted in porous glass with pores increased to 10-20 nm in diameter in order to increase their concentration. Scintillation from 1/16 in. thick nanocomposite was observed under α irradiation from 0.2 μCi $^{243-244}Cm$ source. Due to a poor match between QD emission at 540 nm and a PMT used to record scintillation event, only 0.4% of photons emitted by the QDs were amplified, resulting in a poor, barely detectable signal. These results were significantly improved in a subsequent paper by the same authors [Létant 2006b], where a PMT with 15% quantum efficiency at 510 nm produced a clear pulse height spectrum, significantly above the background.

Nanoporous glass impregnated with CdSe/ZnS colloidal QDs emitting at 510 nm was also used to detect radiation from 1 μCi $^{241}Am$ source, emitting 59 keV γ rays [Létant 2006b]. Energy resolution of ~15% obtained by recording the scintillation output from 1 in. thick nanocomposite over the period of 3 days was twice better than the corresponding energy resolution of ~30% observed for 1 in.×1 in. Ø bulk NaI:Tl crystal.

X-ray luminescence of BaFBr NCs doped with Eu or Mn, and of $LaF_3$:Ce was studied in [Chen 2006]. BaFBr:Eu,Mn exhibited persistent luminescence (afterglow) for as long as 8 minutes after the X-ray excitation source was turned off, hence it is not suitable for fast radiation detectors.

Preliminary data on scintillation response of $LaF_3$:Ce NCs embedded in an organic matrix and exposed to $^{241}Am$ as well as $^{57}Co$ (89% 122 keV and 11% 136 keV photons) sources were given in [McKigney 2007]. The energy resolution was stated as "not good", supposedly due to low quantum efficiency of the $LaF_3$:Ce NCs.

Compared to currently used scintillating particles of the micrometer size, NCs offer the prospect of significantly improved performance. Due to their small size, they may have better solubility in organic polymer or inorganic sol-gel host materials and to cause much less scattering, which should result in higher efficiency of the scintillator. While the bulk materials may have poor efficiency of light emission at room temperature, the effects of quantum confinement are expected to greatly enhance the probability of radiative transitions. Due to three-dimensional confinement and much better overlap of electron and hole wavefunctions, the optical transitions may be much faster than in bulk scintillators, which should eliminate the major problem of relatively slow response of scintillator detectors. In addition, NC scintillator material allows for scalability, ruggedness, and enhanced design flexibility, in general, of the entire detection system. Heterogeneous core/shell nanoparticle morphology can very effectively address the problem of stabilizing highly hygroscopic or even deliquescent scintillating material.

US publication Nos. 2008/0128624; 2008/0093557; and 2008/0191168 describe $LaBr_3$:Ce nanoparticles in a matrix to provide a nanocomposite scintillator. However, stable non-hygroscopic shells for stabilization of highly hygroscopic $LaBr_3$:Ce nanoparticles are not disclosed.

SUMMARY OF THE INVENTION

The present invention provides a scintillator material that comprises nanoparticles (nanocrystals) comprising lead (Pb) and iodine (I) and optionally one or both of oxygen (O) and hydrogen (H) wherein the nanoparticles exhibit scintillation under gamma irradiation.

In an illustrative embodiment of the invention, the scintillator nanoparticles comprise PbIOH wherein Pb, I, O, and H are in generally equiatomic proportions, or non-equiatomic variants thereof, that exhibit scintillation under gamma irradiation. The scintillator nanoparticles have a particle dimension in the range of about 5 to about 100 nm.

In another illustrative embodiment of the invention, the scintillator nanoparticles comprise $Pb_3O_2I_2$ that exhibit scintillation under gamma irradiation. The scintillator nanoparticles have a particle dimension in the range of about 5 to about 100 nm.

The present invention also provides microparticles (microcrystals) comprising lead (Pb), iodine (I), and optionally one or both of oxygen (O) and hydrogen (H) grown in a nanoparticle colloidal solution over time to a particle dimension greater than 0.1 μm, that exhibit scintillation under gamma irradiation.

In an illustrative embodiment of the invention, the microparticles comprise PbIOH wherein the Pb, I, O and H are in generally equiatomic proportions or non-equiatomic variants thereof. The microparticles have a particle dimension in the range of about 0.1 to about 10 microns, such as about 2 microns, depending on the growth time in the nanoparticle colloidal solution.

The lead-iodide-based scintillator material pursuant to the invention can be used for time-of-flight PET, while providing optimal match between NC emission and spectral response of standard PMTs, can offer higher speed and higher efficiency of optical emission for room temperature. In addition, lead-iodide-based NC scintillator material allows for scalability, ruggedness, and enhanced design flexibility, in general, of the entire detection system.

The present invention provides in another embodiment a heterogeneous scintillator material that comprises core/shell nanoparticles wherein the nanoparticle comprises a highly hygroscopic or deliquescent halide-based core activated with Ln ions therein where Ln is one or more of La, Ce, Pr, Nd, Pm, Sm, Eu, Gd, Tb, Dy, Ho, Er, Tm, Yb, and Lu, and an environmentally stable non-hygroscopic shell thereon, wherein the nanoparticles exhibit scintillation under gamma irradiation. The core can be activated by inclusion of trivalent $Ln^{3+}$ and/or divalent $Ln^{2+}$ lanthanide ions (Ln=La, Ce, Pr, Nd, Pm, Sm, Eu, Gd, Tb, Dy, Ho, Er, Tm, Yb, Lu) in an illustrative embodiment.

In a further illustrative embodiment thereof, the heterogeneous nanoparticle can comprise highly hygroscopic lanthanide halide ($LaBr_3$ or $LuI_3$) core activated with lanthanide ions therein, and protected with stable non-hygroscopic $LaF_3$ shell on the core.

In still another illustrative embodiment, the heterogeneous nanoparticle can comprise a deliquescent alkaline earth halide ($SrI_2$ or $BaI_2$) core activated with lanthanide ions, and protected with stable non-hygroscopic ($SrF_2$, $BaF_2$) shell on the core.

A further embodiment of the invention envisions a composite scintillator comprising the nanoparticles, microparticles and/or core/shell nanoparticles described above disposed in a polymer, glass, ceramic, liquid or other matrix.

These and other advantages of the invention will become more readily apparent from the detailed description taken with the following drawings.

DESCRIPTION OF THE DRAWINGS

FIG. 1a is a bright-field TEM (transmission electron microscope) image of lead-iodide-based colloidal nanocrystals nine (9) days after synthesis. FIG. 1b is a high resolution TEM image of the nanocrystals of FIG. 1a.

FIG. 2 is the energy dispersive spectrum of the lead-iodide-based nanocrystals obtained nine (9) days after synthesis, used in conjunction with the TEM, shows multiple lead and iodine lines.

FIG. 6a is the PL emission spectra for the colloidal nanocrystal solution, while

FIG. 7a shows the observed increase in PL intensity for a control sample of lead-iodide-based NC's over 168 days after synthesis, while

DESCRIPTION OF THE INVENTION

Figure 3:
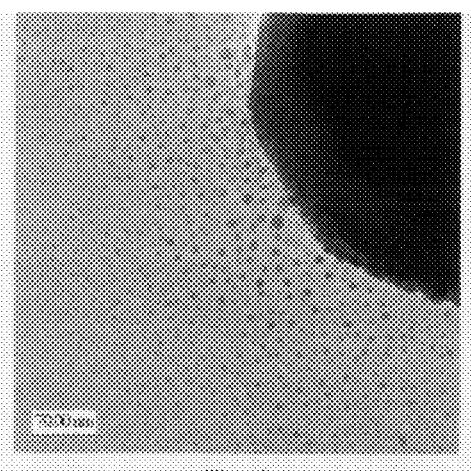
FIG. 3 is a bright-field TEM image of lead-iodide-based NC sample sixty-two (62) days after synthesis at 40,000×. The electron beam current was 108 μA.

The present invention provides in an embodiment lead-iodide-based scintillator materials that comprise lead (Pb) and iodine (I) and optionally present one or both of oxygen (O) and hydrogen (H), and that have different particles sizes depending on a method parameter employed to grow the particles in a colloidal solution. The scintillator materials thus may include or may not include oxygen and/or hydrogen.

In one embodiment of the invention, the present invention provides a scintillator material that comprises nanoparticles [e.g. nanocrystals designated NC] comprising lead (Pb) and iodine (I) and optionally one or both of oxygen (O) and hydrogen (H). In a particular illustrative embodiment of the invention, the scintillator nanoparticles can comprise PbIOH wherein the Pb, I, O, and H are in generally equiatomic proportions or non-equiatomic variants thereof that exhibit scintillation under gamma irradiation. The scintillator nanoparticles have a particle dimension in the range of about 5 to about 100 nm. In another particular illustrative embodiment of the invention, the scintillator nanoparticles can comprise $Pb_3O_2I_2$ that exhibit scintillation under gamma irradiation. The scintillator nanoparticles have a particle dimension in the range of about 5 to about 100 nm.

In yet another embodiment of the present invention, microparticles (microcrystals) are provided comprising lead (Pb) and iodine (I) and optionally one or both of oxygen (O) and hydrogen (H) grown in a nanoparticle colloidal solution over time to a particle dimension greater than 0.1 μm. The microparticles can comprise PbIOH wherein the Pb, I, O, and H are in generally equiatomic proportions or non-equiatomic variants thereof. The microparticles have a particle dimension in the range of about 0.1 to about 10 microns, such as about 2 microns, depending on the growth time in the nanoparticle colloidal solution. The microparticles may find use as a scintillator material as well.

EXAMPLE 1

A. Synthesis of Lead-Iodide-Based Nanocrystals and Microcrystals

One synthesis procedure involves dissolution of bulk lead iodide in a coordinating solvent tetrahydrofuran (THF), subsequent re-crystallization with the addition of anhydrous methanol, and addition of dodecylamine (DDA) to obtain solvent-stabilized lead iodide NCs. The THF, anhydrous methanol, and DDA were purchased from Sigma Aldrich and used directly. A synthesis procedure also is described in [Finlayson, 2006], which was used for synthesis of $PbI_2$ NCs.

In a typical procedure, 100 mg of high purity (99.999%) lead (II) iodide powder is initially dissolved in 15 mL of THF under continuous stirring at RT (room temperature) and under atmospheric pressure. The above conditions are important, since solubility is a strong function of temperature and pressure. Subsequently, the solution is sonicated in centrifuge tubes in order to obtain a saturated solution. Then, to remove any insoluble suspension still present, the saturated solution is centrifuged and the clear deep yellow supernatant is decanted out into a flask. Finally, while stirring this solution continuously under nitrogen atmosphere, 10 mL of anhydrous methanol is gradually added to the flask.

Since lead iodide is only slightly soluble in methanol, a change in color is noticed. This change from deep yellow to colorless solution is interpreted as indication of the formation of nascent nanoparticles due to re-precipitation in the solution, although applicants do not wish or intend to be bound by ant theory in this regard. For this reason, the volumetric ratio of THF to methanol is very important in determining the growth kinetics and nature of the resulting nanoparticles. This process is allowed to continue for 24 hours under constant stirring in nitrogen atmosphere. After that, the process is quenched by addition of DDA at a ratio of 1 mg per 1 mL of the resulting nanoparticulate colloidal solution and the solution is stored in a vial at RT.

It should be noted that although DDA was added with the intention to stop growth by capping the crystals, as recommended in [Finlayson 2006], it was found that this quenching procedure was inefficient, as synthesized NCs left in THF/methanol/DDA solvent kept growing over time, reaching a micrometer size greater than 1000 nanometers in about 3-month period.

B. Characterization of Lead-Iodide-Based Nanocrystals and Microcrystals

B.1. Transmission Electron Microscopy and Corresponding Energy Dispersive Spectroscopy Analysis For structural characterization, TEM samples were prepared 9 days after synthesis by placing a drop of the colloidal solution in a 200-mesh carbon coated copper grid and the solvent was allowed to dry, fixing the NCs on the grid. High-resolution transmission electron microscope, JEOL-2010 operating at 200 kV, was used with the OXFORD Link ISIS energy dispersiven spectroscopy (EDS) apparatus.

Bright field TEM images (FIG. 1a) show relatively monodisperse nanoparticles of about 7 to 15 nm in size. The high-resolution TEM images (FIG. 1b) indicate particles appearing to have a hexagonal crystalline structure. While the TEM images confirm presence of nanoparticles and their crystalline nature, the EDS analysis performed at the TEM facility confirms presence of both lead and iodine in the NCs (FIG. 2).

As described below in Sections B.3 and B.4, studies of radiation hardness under gamma irradiation led to discovery of continuous increase in the light intensity of both control and irradiated samples. In order to better understand possible origin of that phenomenon, applicants have performed another TEM study, which revealed formation of much larger crystals, illustrated in FIG. 3. Their elemental analysis using EDS was not possible, as they were too thick to provide data in the transmission mode. The next section B.2 used SEM for further analysis of the microparticles.

Figure 4A:
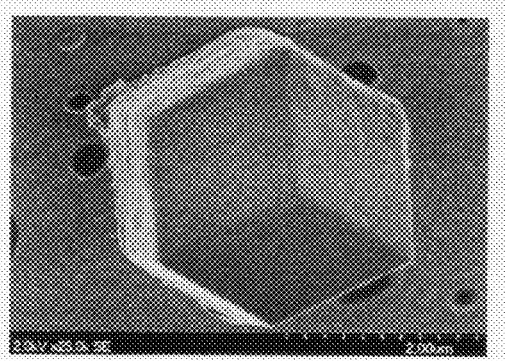
FIGS. 4a and 4b are SEM (scanning electron microscope) images of micro-scale lead-iodide-based crystals showing ditrigonal pyramidal class structure.
Figure 4B:
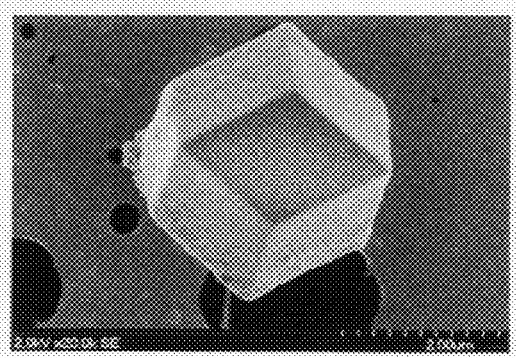

B.2. Scanning Electron Microscopy and Corresponding Energy-Dispersive Spectroscopy Analysis FIGS. 4a, 4b show three-dimensional morphology of the lead-iodide-based microparticle (microcrystals) material as observed by SEM 113 days after synthesis. The SEM images revealed single crystals having a dimension of about 2 μm in size. An interesting ditrigonal pyramidal class structure was inferred from these images. Although over 40 polytypes of $PbI_2$ have been reported in the literature [Chand 1975], applicants have been unable to identify the synthesized crystals as belonging to any polytype of $PbI_2$.

Figure 4C:
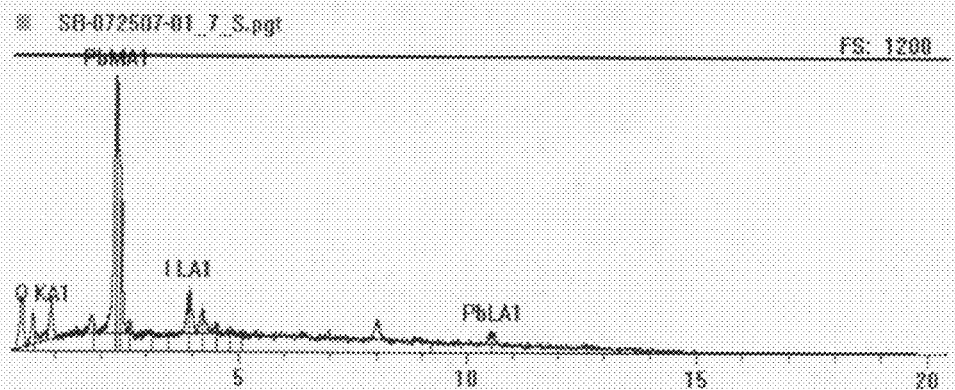
FIG. 4c is an EDS spectrum showing presence of lead, iodine, and oxygen.

The SEM EDS analysis FIG. 4c provides evidence on the presence of lead and iodine in the crystals. Furthermore, the elemental analysis of the sample revealed that there was an equal percentage of oxygen along with lead and iodine as shown in the Table below. Another possibility strongly suggested by the SEM analysis of micro-scale crystals is PbIOH (iodolaurionite). Its composition is consistent with the results of the SEM EDS elemental analysis (hydrogen does not show up on EDS spectra), and it belongs to orthorhombic crystalline system.

| Elemental Analysis Table | | | | | |
|---|---|---|---|---|---|
| Element | Line | keV | KRatio | Wt % | At % |
| O | Kα1 | 0.523 | 0.0212 | 4.23 | 31.53 |
| Pb | Mα1 | 2.346 | 0.4801 | 59.01 | 33.94 |
| I | Lα1 | 3.937 | 0.3164 | 36.76 | 34.53 |
| Total | | | 0.8177 | 100.00 | 100.00 |

Elemental analysis table showing percentage composition of elements of micro-scale lead-iodide-based crystals.

B.3. Photoluminescence and Absorption Spectroscopy

The photoluminescence (PL) spectra were collected using a Horbia Jobin Yvon Fluorolog-3 spectrofluorometer. PL was measured for the colloidal nanocrystals solution as well as for the THF/methanol/DDA mixture of solvents. The absorption measurements were conducted using a CARY 400 UV-VIS spectrophotometer. The sample was prepared by adding drops of the NC solution to a three to two ratio mixture of THF and methanol. The same solvent mixture was used in the reference cells of the spectrophotometer.

Figure 5:
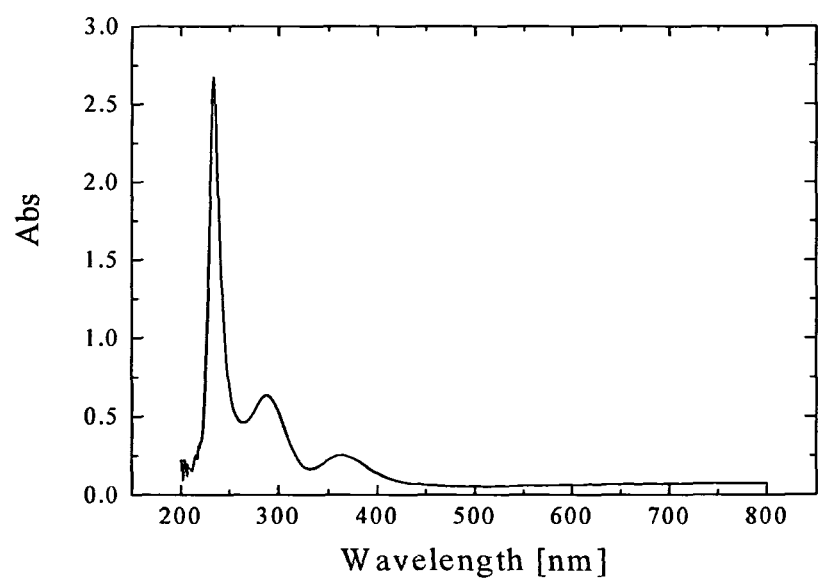
FIG. 5 is an absorption spectrum of the lead-iodide-based nanocrystals measured two days after synthesis.
Figure 6A:
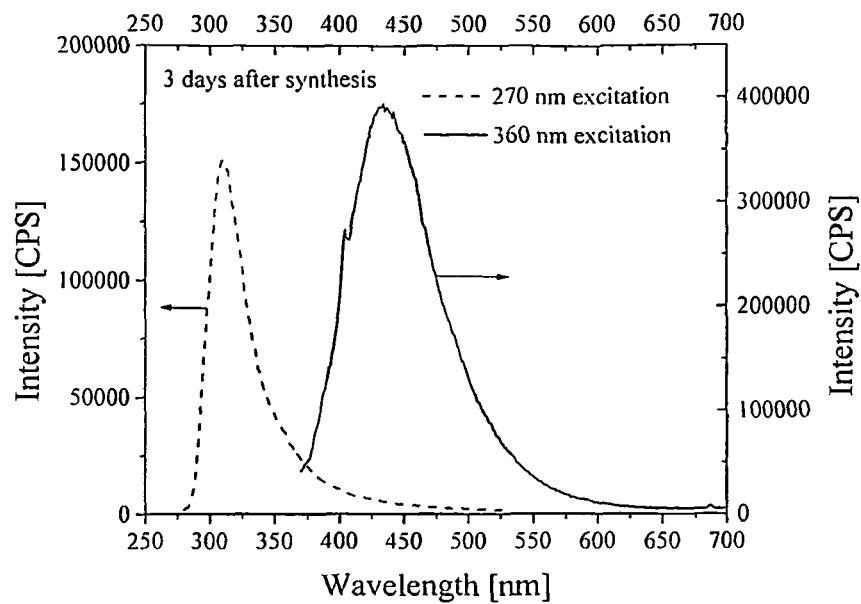
Figure 6B:
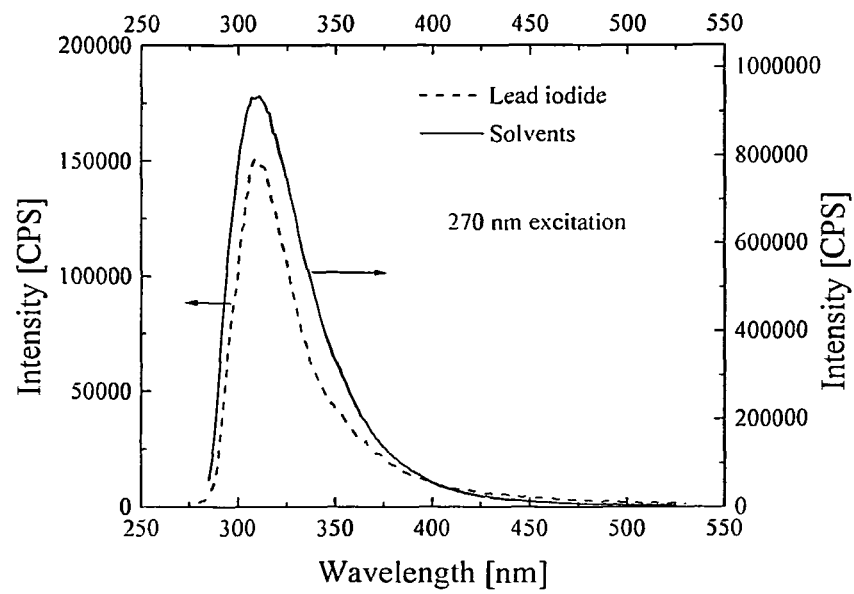
FIG. 6b is the PL emission spectra for the solvent mixture: THF, anhydrous ammonia, and DDA.

The absorption spectrum measured 2 days after synthesis (FIG. 5) clearly shows three discrete ultraviolet absorption peaks. The longest-wavelength peak around 360 nm corresponds to direct band-to-band transitions in the material. When used for the excitation of the sample, it produces blue photoluminescence with the peak centered at 437 nm (FIG. 6). The middle peak in the absorption spectrum was identified as originating from the TF/methanol/DDA mixture of solvents (FIG. 6b). The origin of the shortest wavelength peak in the absorption spectrum remains unknown.

Figure 7A:
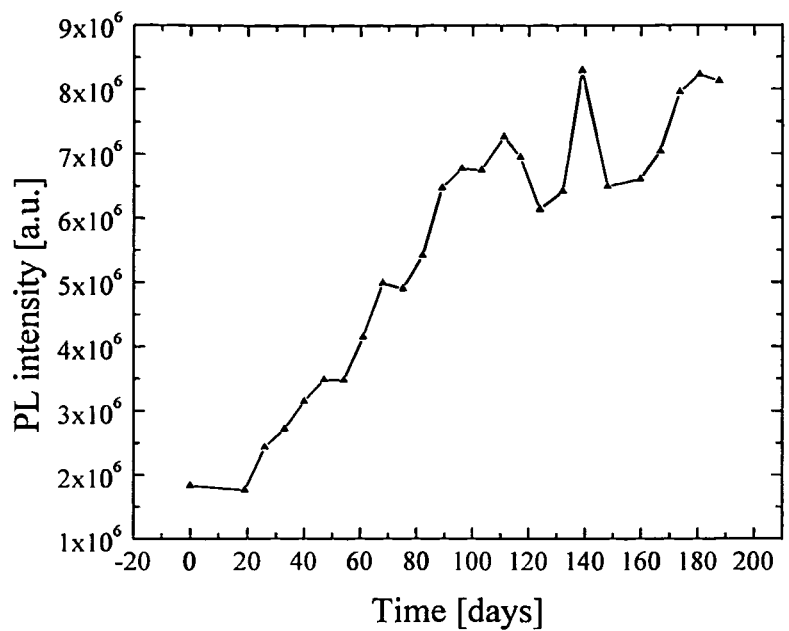
Figure 7B:
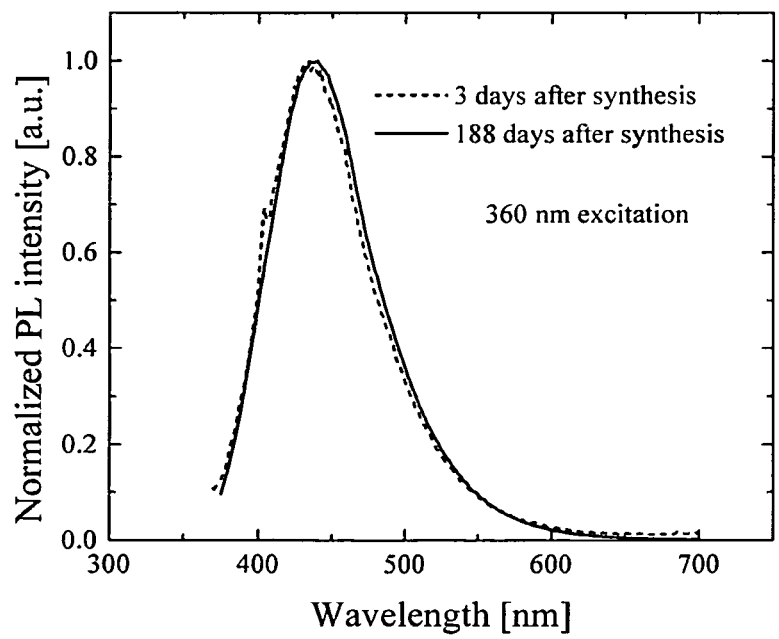
FIG. 7b shows the spectral change in PL peak over that period of time.

In the process of conducting regular PL measurements at weekly intervals, associated with the radiation hardness testing (see Section B.4), a steady increase in PL intensity from the NC solution was observed in both control and irradiated samples. FIG. 7a shows about 4 times increase in PL intensity over a period of 188 days after synthesis. No shift in spectral position of the peak was observed during that time (FIG. 7b). The increase in PL intensity correlated with the formation of larger-size crystals as discussed in section B.2.

B.4. Radiation Hardness Testing

As no published data exist on the degradation effects of colloidal NCs exposed to gamma radiation, it is important to evaluate their radiation hardness. Applicants have used an Eberline 1000B multiple-source gamma calibrator to study the effects of irradiation on PL properties of lead-iodide-based NCs. A 39.7 curie $^{137}Cs$ source was used in the radiation hardness tests. $^{137}Cs$ is a monoenergetic 622 keV gamma ray source of a similar energy to the 511 keV gamma rays produced during positron annihilation.

Optical degradation of the NCs was evaluated based on the measured dependence of their PL intensity on the irradiation dose. PL measurements were performed after weekly periods of irradiation to check if the NCs exhibited any signs of degradation in their optical characteristics. In order to exclude the effects of natural degradation, for example due to oxidative processes, on PL properties of the NCs, the applicants prepared two identical samples of the lead-iodide-based material and measured their PL spectra prior to irradiation experiments, thus establishing the base line for monitoring PL dynamics under irradiation. One of the samples was then to be irradiated, while the other one, a "control" sample, was to be stored under RT conditions and to be used for comparison purposes. Assuming that both irradiated and control samples undergo the same aging process and react to environmental changes in the same way, the applicants corrected the results of PL degradation measurement of irradiated sample for any changes in PL intensity of corresponding control sample with respect to its base line measurement.

Figure 8:
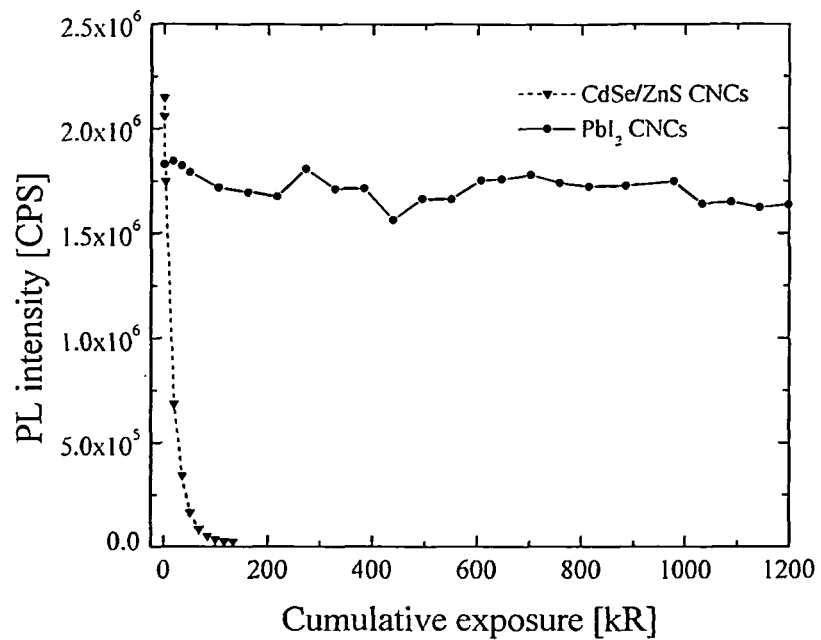
FIG. 8 shows PL intensity values in counts per second for lead-iodide and CdSe/ZnS NC's as a function of cumulative exposure in kiloroentgens.
Figure 9:
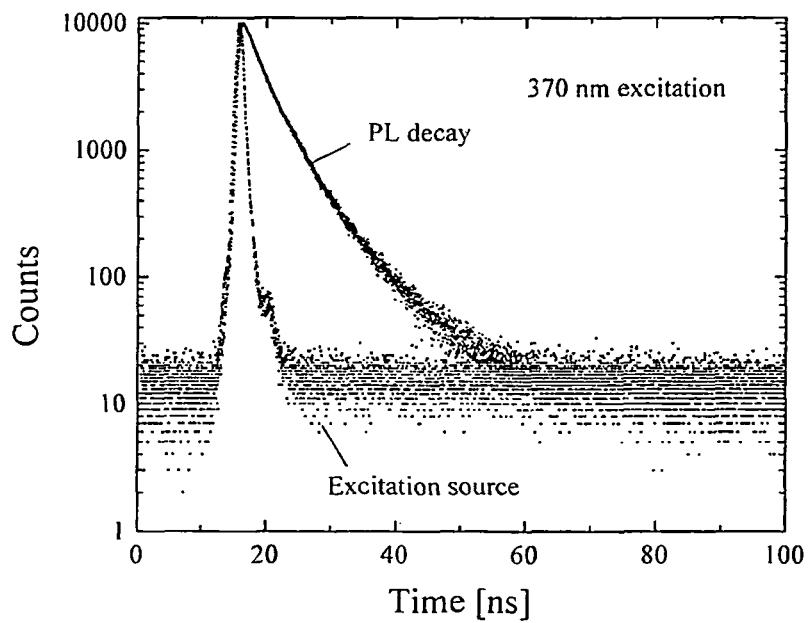
FIG. 9 shows the results of PL lifetime measurements for lead-iodide based NC's.

As described in Section B.3, surprisingly, the PL output of both the control and irradiated samples not only has not degraded with time, but it kept improving (see FIG. 7a). FIG. 8 shows the PL output, normalized to its original level by comparing with the control sample, as a function of cumulative exposure in roentgens. The measured values of PL intensity were taken at the peak of PL emission. The time between points is one week of exposure, and the increase in the distance between points is due to changing the exposure rate from the initial 97.3 roentgens/hr to 330.3 roentgens/hr, which was done in order to accelerate the gamma-ray-induced degradation experiment.

No significant loss of PL intensity was observed in the lead-iodide-based material due to the exposure to gamma irradiation. The lead-iodide-based NCs turned out to be practically radiation insensitive, maintaining luminescence after over 1630 krad of absorbed dose. This should be contrasted with CdSe/ZnS NCs, which lost luminescence rapidly (FIG. 8).

B.5. Quantum Efficiency and PL Lifetime Measurements

According to the procedure established by Horiba Jobin Yvon [Porres 2006] and based on the method of deMello et al. [deMello 1997], quantum efficiency of the lead-iodide-based material was measured in a dilute solution of the sample using the integrating sphere capability on the Horiba Jobin Yvon Fluorolog-3 spectrofluorometer. As distinct from comparative methods of measuring quantum efficiency, integrating sphere approach allows for absolute measurement of quantum efficiency over a wide spectral range.

Quantum efficiency for the blue photoluminescence of the lead-iodide-based material was measured at two different times after synthesis. Quantum efficiencies of 6.7% and 15.6% were recorded after 115 and 197 days after synthesis, respectively, which is consistent with the PL intensity increasing over time (FIG. 7a).

The PL lifetime of NCs is expected to be shorter than that of bulk material, which would provide advantages in positron emission tomography. PL lifetime measurements for the lead-iodide-based material were taken on the same Horiba Jobin Yvon Fluorolog-3 spectrofluorometer in a different configuration, allowing for time-correlated single photon counting. Very short PL lifetimes of ~4 ns and ~4.2 ns were obtained from the measurements taken, respectively, 148 and 190 days after synthesis. In comparison with other inorganic high-speed scintillators (Table 1), the synthesized NCs possess the best combination of speed and efficiency. A decay time of 41 ns at RT was reported for LYSO scintillators, which is an order of magnitude longer than the room-temperature PL lifetime of ~4 ns that was measured for the lead-iodide-based material.

TABLE 1

List of high-speed inorganic scintillators with their respective decay times and quantum efficiencies.

$YAlO_3$: Ce τ = 25 ns, 21,000 phot/MeV, QE ~7%
$LaBr_3$: Ce τ = 35 ns, 61,000 phot/MeV, QE ~21%
$LuAlO_3$: Ce τ = 18 ns, 12,000 phot/MeV, QE ~4%
$PbWO_4$ τ = 3 ns, 300 phot/MeV, QE ~0.09%
ZnO (fast component) < 0.8 ns, < 860 phot/MeV, QE < 0.2%

B.6. Scintillation Experiments

Figure 10:
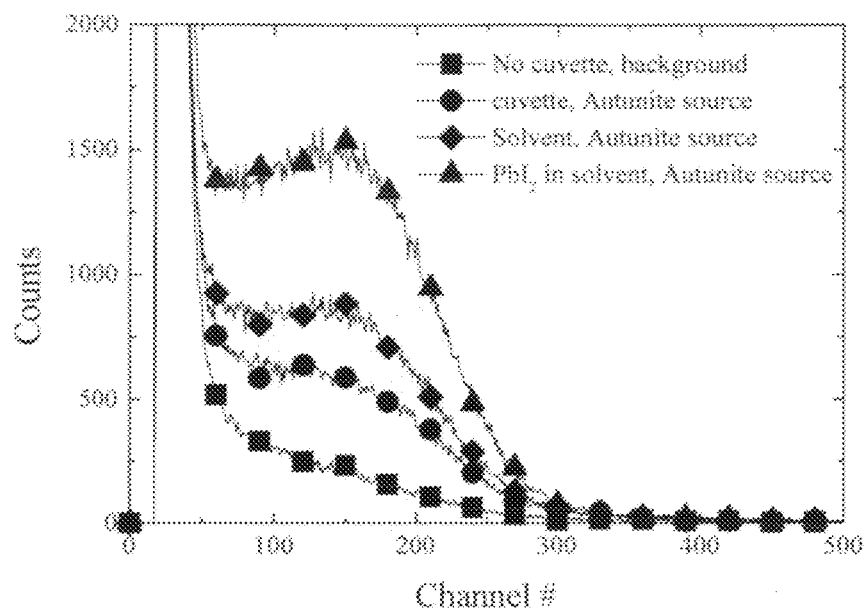
FIG. 10 shows scintillation of lead-iodide-based crystals and test measurements in absence of lead-iodide based crystals.

To test the lead-iodide-based material for scintillation, 0.14 µCi source of hydrated calcium uranyl phosphate, was used. This natural ore of uranium, known as autunite, with the chemical formula of $Ca(UO_2)_2(PO_4)_2 \cdot 10\text{-}12H_2O$ [Locock 2003], provides a polyenergetic source of gamma rays from 100 keV to 1 MeV. Scintillation events were detected with a Hamamatsu R943-02 reflection-type GaAs photomultiplier tube (PMT) at a bias of 1,999 V, and the electronic signal from the PMT was processed using Ortec 113 preamplifier, Ortec 570 amplifier and pulse shaper, Ortec Illusion 25 multichannel analyzer. Data were analyzed using Ortec Maestro-32 for Windows software. The parameters of the Ortec 570 amplifier were: gain of 890 and a shaping time of 10 µs. All measurements were taken over a live time of 100,000 s. Tests were conducted by placing the autunite source next to two standard 10 mm×10 mm×4.5 cm spectrosil cuvettes filled with the lead-iodide-based material, which were placed side-by-side in front of the photomultiplier tube. After closing the light blocking enclosure, the photomultiplier tube was left in the dark for a half an hour to reduce spurious counts due to exposure to non-signal light. Four tests were performed to rule out possible false positives due to light leaks, scintillation of the glass cuvette, and scintillation of the solvent. FIG. 10 clearly demonstrates that the lead-iodide-based crystals do scintillate under gamma irradiation. While some background scintillation was observed from the quartz cuvette and the solvent, the signal from lead-iodide-based material is much stronger.

B.7. Mass Energy-Absorption Calculations and Comparison with LYSO

One of the figures of merit for a scintillator is how efficiently the material absorbs gamma radiation. Neglecting non-absorptive scattering effects, a material or element can be characterized with the mass energy-transfer coefficient, $\mu_{tr}/\rho$ expressed in units of cm$^2$/g. This parameter is related to the portion of attenuated energy that is originally absorbed by the material as kinetic energy of electrons or re-emitted immediately as characteristic X-rays. The mass energy-absorption coefficient, $\mu_{en}/\rho$ with units of [cm$^2$/g] describes the amount of energy retained by the material. It is smaller than the energy-transfer coefficient due to energy loss from Brehmsstrahlung radiation from ionized electrons and is related to $\mu_{tr}/\rho$ by the parameter g, where $\mu_{en}/\rho=(1-g)\mu_{tr}/\rho$. To calculate the amount of energy absorbed by a sheet of material, the formula $I=I_0\exp\{-(\mu_{en}/\rho)\rho x\}$ is used, where the original gamma flux is $I_0$, the density of the material is $\rho$, and the thickness of the material is x. Energy-transfer and energy-absorption tables for the elements and some common materials are available, but for an unknown material, the energy-absorption can be calculated from the elemental data as:

$$\left(\frac{\mu_{en}}{\rho}\right)_{mix} = \left(\frac{\mu_{tr}}{\rho}\right)_A (1-f_A g_A - f_B g_B - \ldots)f_A + \left(\frac{\mu_{tr}}{\rho}\right)_B (1-f_A g_A - f_B g_B - \ldots)f_B + \ldots \quad (1)$$

The energy-transfer coefficient for a material can also be calculated from the elemental data [Attix 1986]:

$$\left(\frac{\mu_{tr}}{\rho}\right)_{mix} = \left(\frac{\mu_{tr}}{\rho}\right)_A f_A + \left(\frac{\mu_{tr}}{\rho}\right)_B f_B + \ldots \quad (2)$$

With the above information, we tabulated the values for $\mu_{en}/\rho$, $\mu_{tr}/\rho$, and for the thickness of material required to absorb half of the incident radiation at 511 keV for lead iodide, iodolaurionite, and LYSO of the same composition as used in the GEMINI TOF PET [Surti 2007] (Table 2).

TABLE 2

Calculated material constants for PbI$_2$, PbIOH, and Lu$_{1.8}$Y$_{0.2}$SiO$_5$ at 511 keV.

| Material | $\mu_{tr}/\rho$ [cm$^2$/g] | $\mu_{en}/\rho$ [cm$^2$/g] | Density [g/cm$^3$] | Half Value Layer [cm] |
|---|---|---|---|---|
| PbI$_2$ | 0.11543 | 0.06100 | 6.16 | 1.8446 |
| PbIOH | 0.12336 | 0.06694 | 6.8 | 1.5227 |
| Lu$_{1.8}$Y$_{0.2}$SiO$_5$ | 0.11017 | 0.05592 | 7.1 | 1.7459 |

The table above shows PbI$_2$ has a higher mass energy-absorption coefficient than LYSO, but due to the material's lower density, lead iodide requires a larger thickness to absorb half of an incoming 511 keV gamma flux. PbIOH, on the other hand, has the largest mass energy-absorption coefficient of the three materials, and, with its higher density, has a smaller half value layer thickness than LYSO.

EXAMPLE 2

A. Second Synthesis of Lead-Iodide-Based Nanocrystals (PbIOH)

The synthesis procedure for PbIOH nanocrystals was a modification of PbClOH synthesis reported by H. Zhang, M. Zuo, G. Li, S. Tan and S. Zhang, "Laurionite nanowires and nanoribbons: rapid mechanochemical solution synthesis and optical properties", Nanotechnology 16, pp. 3115-3119 (2005).

During a typical synthesis procedure, 0.461 g (~1 mmol) of lead (II) iodide (PbI$_2$) powder and 3 ml of 0.1 M sodium hydroxide (NaOH) solution were put into a mortar and ground with a pestle for 2 min at room temperature. The solution was collected and alternately centrifuged with deionized water, then centrifuged with ethanol, three times. The remaining yellowish samples were collected and stored in ethanol. An alternative method of synthesizing iodolaurionite was successfully accomplished by substituting potassium hydroxide (KOH) for the sodium hydroxide.

High-resolution TEM analysis revealed nanocrystals 3-15 nm in diameter. XRD measurements confirmed that these nanocrystals comprised PbIOH (iodolaurionite).

EXAMPLE 3

A. Third Synthesis of Lead-Iodide-Based Nanocrystals (Pb$_3$O$_2$I$_2$)

The synthesis procedure for Pb$_3$O$_2$I$_2$ nanocrystals was a modification of Pb$_3$O$_2$Cl$_2$ synthesis reported by K. Lozano, C. Hernandez, T. W. Petty, M. B. Sigman, B. Korgel, "Electrorheological analysis of nano laden suspensions", Journal of Colloid and Interface Science 297, pp. 618-624 (2006).

In this synthesis, 0.332 g of high purity (99.999%) lead (II) iodide (PbI$_2$) powder was added to 32 ml of deionized water. 25 ml of chloroform (CHCl$_3$) with 0.17 g sodium octanoate (NaOOC(CH$_2$)$_6$CH$_3$) were then added to the aqueous PbI2 solution forming two phases—an aqueous phase and a cloudy organic phase. The aqueous phase was then separated and discarded. 0.5 ml of ethylenediamine (C$_2$H$_8$N$_2$) was added to the remaining organic solution. Evaporation of the organic solvent gave an opaque grayish-white solid, which served as the nanocrystal precursor. The precursor was heated in air for 60 min at 170° C. A dark grey solid was formed, and a yellowish solid. The nanocrystals were purified to remove unreacted byproducts by redispersing in chloroform with mild sonication followed by precipitation with ethanol. The precipitate was isolated by brief centrifugation at 4000 rpm for 5 min. The purified nanocrystals appeared as a yellowish powder.

B. Characterization of Pb$_3$O$_2$I$_2$ Nanocrystals

Figure 11:
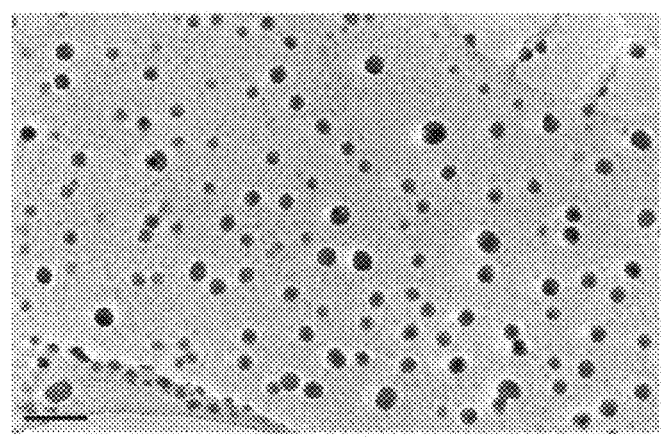
FIG. 11 shows bright-field TEM image of $Pb_3O_2I_2$ nanocrystals.
Figure 12:
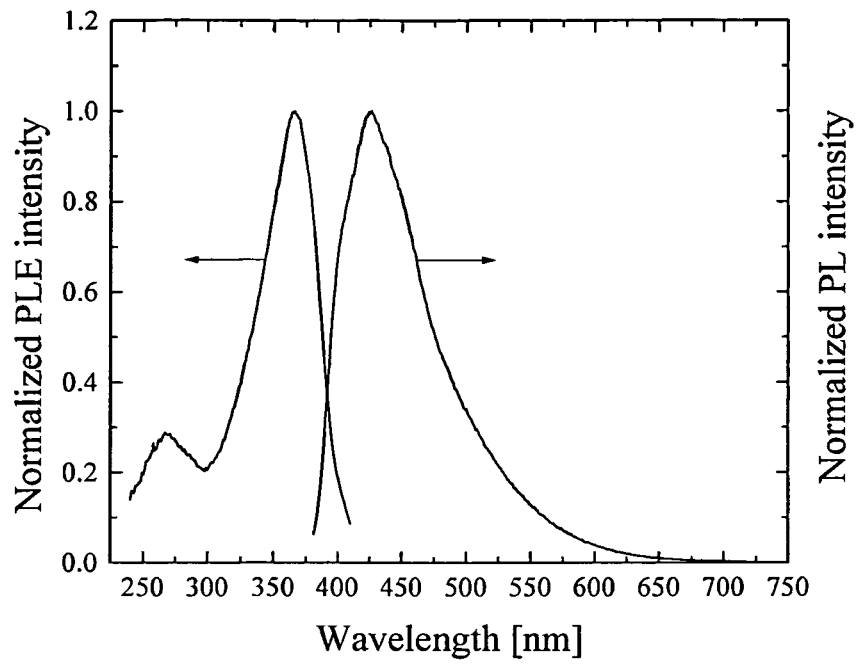
FIG. 12 shows photoluminescence excitation and emission spectra of $Pb_3O_2I_2$ nanocrystals.

The bright-field TEM image of Pb$_3$O$_2$I$_2$ NCs is shown in FIG. 11. FIG. 12 shows photoluminescence excitation and emission spectra of Pb$_3$O$_2$I$_2$ NCs.

In summary, the lead-iodide-based scintillator material pursuant to the invention can be used for time-of-flight PET. While providing optimal match between NC emission and spectral response of standard PMTs, it can offer higher speed and higher efficiency of optical emission for room temperature operation.

The use of time-of-flight technology has improved the speed and resolution of standard PET technology through the use of high brightness, high-speed scintillation materials. As compared to bulk material, NCs provide faster luminescence decay times and increased brightness, features needed for TOF-PET. Lead-iodide-based nanocrystals pursuant to the invention show promise as a new scintillation material for this application. For example, the lead-iodide-based material was shown to be radiation resistant with relatively high quantum efficiency of 15.6%, and very short PL lifetime of ~4 ns, an order of magnitude faster than the decay time of LYSO, a preferred scintillator for TOF-PET systems. According to applicants' calculations, the stopping power of the synthesized material is also superior to that of LYSO. Scintillation of the lead-iodide-based material was confirmed with the use of a poly-energetic gamma source.

Figure 13:
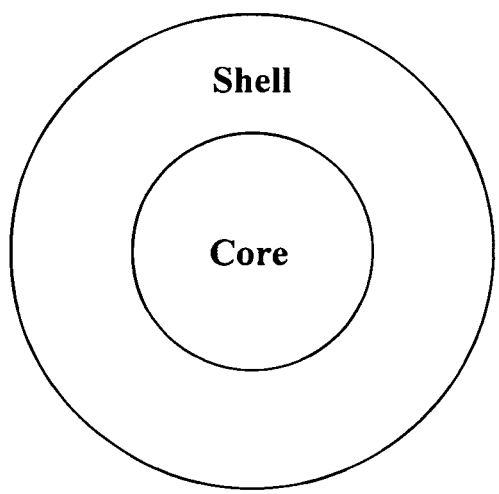
FIG. 13 is a schematic sectional view of a generally spherical core/shell nanoparticle according to an embodiment of the invention.

Heterogeneous Halide-Based Scintillator Material:

The present invention provides in another embodiment a heterogeneous scintillator material that comprises core/shell nanoparticles comprising a highly hygroscopic or deliquescent halide-based core activated by inclusion of Ln ions therein where Ln is one or more of La, Ce, Pr, Nd, Pm, Sm, Eu, Gd, Tb, Dy, Ho, Er, Tm, Yb, and Lu, and a stable non-hygroscopic shell thereon, wherein the nanoparticles exhibit scintillation under gamma irradiation. An illustrative embodiment involves a heterogeneous scintillator material that comprises core/shell nanoparticles comprising a highly hygroscopic or deliquescent halide-based core activated with trivalent $Ln^{3+}$ and/or divalent $Ln^{2+}$ lanthanide ions (Ln=La, Ce, Pr, Nd, Pm, Sm, Eu, Gd, Tb, Dy, Ho, Er, Tm, Yb, Lu) and a stable non-hygroscopic shell thereon, wherein the nanoparticles exhibit scintillation under gamma irradiation. In a further illustrative embodiment thereof, the nanoparticle core can have a particle dimension (e.g. diameter or other dimension) in the range of 2 nm to 100 nm. FIG. 13 schematically illustrates a generally spherical core/shell nanoparticle having an inner core and outer shell on the core, although the nanoparticles can have any shape in practice of the invention.

In another illustrative embodiment, the heterogeneous nanoparticle can comprise a highly hygroscopic lanthanide halide core activated by inclusion of lanthanide ions therein, and protected with a stable non-hygroscopic shell on the core.

The lanthanide halide core can be selected from the group consisting of $LaBr_3$ and $LuI_3$ activated with one or more lanthanide ions such as $Ce^{3+}$ in a concentration or amount sufficient (e.g. 10 atomic % Ce) to achieve desired scintillation when exposed to gamma irradiation. The shell can be $LaF_3$ for lanthanide-activated (e.g. Ce-activated) scintillating $LaBr_3$, and $LuI_3$ cores. Lanthanide activated materials are represented herein by $LaBr_3$:Ce, and $LuI_3$:Ce for convenience wherein Ce is the activator in this example.

In another illustrative embodiment, the heterogeneous nanoparticle can comprise a deliquescent alkaline earth halide core activated with lanthanide ions doped therein, and protected with stable non-hygroscopic shell on the core.

The alkaline earth halide core can be selected from the group consisting of $SrI_2$ and $BaI_2$ doped with one or more lanthanide ions such as $Eu^{2+}$; e.g. $SrI_2$:Eu and $BaI_2$:Eu. The lanthanide dopant is selected to be present in a concentration or amount sufficient (e.g. 0.5 mole % Eu) to achieve desired scintillation when exposed to gamma irradiation. The shell can be $SrF_2$ and $BaF_2$ for the alkaline earth iodide cores, $SrI_2$ and $BaI_2$.

EXAMPLE 4

A. Synthesis of Hygroscopic-Core/Stable-Shell $LaBr_3$:Ce/$LaF_3$ Nanocrystals

In this synthesis, $LaBr_3$:Ce core/undoped $LaF_3$ shell colloidal nanocrystals were synthesized in anhydrous methanol using a procedure adapted from the synthesis of hydrophilic, stable $LaF_3$:Ce colloidal nanocrystals [Wang 2007] by replacing fluorine precursor (ammonium fluoride) with bromine core precursor (ammonium bromide). The entire synthesis was performed under a controlled water-free atmosphere using an argon-filled glovebox and a Schlenk line apparatus connected to an argon line. See Z. Wang, J. Bo, S. Song, L. Hu, J. Liu, and X. Zhen, "One-step synthesis of highly water-soluble $LaF_3$:$Ln^{3+}$ nanocrystals in methanol without using any ligands", *Nanotechnology* 18 (#46), 465-476 (2007) in the list of references below, which are incorporated herein by reference.

Both core and shell precursors were prepared inside the glovebox. Lanthanum nitrate hexahydrate 99.99%, cerium nitrate hexahydrate 99.999%, ammonium bromide 99.9%, ammonium fluoride 99.9%, and anhydrous absolute methanol 99.9% were purchased from Sigma Aldrich Co. and used as such. A 0.65 M lanthanide (lanthanum+cerium) precursor solution for the core was prepared by dissolving 1.17 mmol (506.6 mg) of lanthanum nitrate hexahydrate and 0.13 mmol (56.45 mg) of cerium nitrate hexahydrate in 2 mL of anhydrous methanol. The bromine precursor solution for the core was prepared by dissolving 3 mmol of ammonium bromide in 35 mL of anhydrous methanol. The lanthanum precursor for the shell was prepared by dissolving 5.2 mmol (2.252 g) of lanthanum nitrate hexahydrate in 8 mL of anhydrous methanol and the fluorine precursor for the shell was prepared similarly by dissolving 12 mmol of ammonium fluoride (0.444 g) in 8 mL of anhydrous methanol.

The three-neck flask containing the bromine core precursor in anhydrous methanol was taken out from the glovebox, connected to the Schlenk line, and heated to 60° C. at the rate of 5° C./min. After the temperature reached 60° C., the lanthanide (lanthanum+cerium) core precursor was injected rapidly into the flask. The solution was allowed to stir at 600 rpm for 10 minutes under argon atmosphere. Then, alternate drop wise injections of lanthanum and fluorine shell precursors were done at the rate of 5 drops/min. The solution in the flask was subsequently allowed to stir at 1000 rpm for 2 hours under argon atmosphere. After 2 hours, the solution was purified and precipitated by centrifugation at 5000 rpm using methanol, and dispersed in DI water. It was observed that the cerium-doped lanthanum bromide/undoped lanthanum fluoride core/shell nanocrystals were highly dispersible in water due to the hydrophilic hydroxyl groups attached to lanthanum fluoride shell, and were also very stable without any signs of aggregation or flocculation. The nanocrystals were hexagonal platelets 10-20 nm wide and 5-10 nm thick.

Composite Scintillator Materials:

In a further embodiment of the invention, the nanoparticles and/or microparticles described above and in Examples 1-4 are disposed in a suitable matrix, which can be a solid, gel, porous, or liquid matrix, to provide a composite scintillator. The matrix can include, but is not limited to, a polymer matrix, glass or ceramic matrix, aerogel matrix, optical fiber matrix, liquid matrix, and others. The nanoparticles and/or microparticles can be incorporated into the matrix using various methods appropriate to the matrix material and include, but are not limited to, mixing the nanoparticles or microparticles into a liquid or melted matrix material and solidifying the matrix material; heating and vacuum consolidating a dispersion of nanoparticles and matrix particles such as polymer or glass particles; sol-gel processing; and others.

Although the invention has been described with respect to certain embodiments thereof, those skilled in the art will understand that changes and modifications can be made thereto without departing from the scope of the invention as set forth in the appended claims.

REFERENCES

[Amand 1992] T. Amand, X. Marie, B. Dareys, J. Barrau, M. Brousseau, D. J. Dunstan, J. Y. Emery, and L. Goldstein, "Well-width dependence of the excitonic lifetime in strained III-V quantum-wells", *J. Appl. Phys.*, vol. 72 (#5), pp. 2077-2079 (1992).

[Artemyev 1997] M. V. Artemyev, Y. P. Rakovich, and G. P. Yablonski, "Effect of dc electric field on photoluminescence from quantum-confined $PbI_2$ nanocrystals", *J. Cryst. Growth*, vol. 171 (#3-4), pp. 447-452 (1997).

[Attix 1986] F. Attix, *Introduction to Radiological Physics and Radiation Dosimetry*, John Wiley & Sons Inc., New York 1986, pp. 155-156 and p. 187.

[Bangerter 1998] M. Bangerter, F. Moog, I. Buchmann, J. Kotzerke, M. Greisshammer, M. Hafnerm, K. Klsner, N. Frickhofen, S. N. Reske, and L. Bergmann, "Whole-body 2-[$^{18}F$]-fluoro-deoxy-D-glucose positron emission tomography (FDG-PET) for accurate staging of Hodgkins's disease", *Ann. Oncol.*, vol. 9, pp. 1117-1122 (1998).

[Chand 1975] M. Chand, and G. C. Trigunayat, "Atomic structures of three new rhombohedral polytypes of lead iodide", *Acta Cryst*, vol. B31, pp. 1222-1223 (1975).

[Chen 2006] W. Chen and J. Zhang, "Using nanoparticles to enable simultaneous radiation and photodynamic therapies for cancer treatment", *J. Nanosci. Nanotechnol.*, vol. 6 (#4), pp. 1159-1166, April 2006.

[Cherepy 2008] N. J. Cherepy, G. Hull, A. D. Drobshoff, S. A. Payne, E. Van Loef, C. M. Wilson, K. S. Shah, U. N. Roy, A. Burger, L. A. Boatner, W.-S. Choong, W. W. Moses, "Strontium and barium iodide high light yield scintillators", *Appl. Phys. Lett.*, vol. 92(#8), 083508 (2008).

[Chuang 1998] S.-L. Chuang, N. Nakayama, A. Ishibashi, S. Taniguchi, and K. Nakano, "Degradation of II-VI blue-green semiconductor lasers", *IEEE J Quantum Electron.*, vol. 34 (#5), pp. 851-857, May 1998.

[Dai 2002] S. Dai, S. Saengkerdsub, H.-J. Im, A. C. Stephan, and S. M. Mahurin, "Nanocrystal-based scintillators for radiation detection", *Unattended Radiation Sensor Systems for Remote Applications,* 15-17 Apr. 2002, Washington, D.C., *AIP Conf. Proc.*, vol. 632, pp. 220-224 (2002).

[deMello 1997] J. C. deMello, H. F. Wittmann, and R. H. Friend, "Improved experimental determination of external photoluminescence quantum efficiency", *Adv. Mater.*, vol. 9 (#3), p. 230 (1997).

[Derenzo 2002] S. E. Derenzo, M. J. Weber, and M. K. Klintenberg, "Temperature dependence of the fast, near-band-edge scintillation from CuI, $HgI_2$, $PbI_2$, ZnO:Ga and CdS:In", *Nucl. Instrum. Methods Phys. Res. Sect. A—Accel. Spectrom. Dect. Assoc. Equip.*, vol. 486 (#1-2), pp. 214-219 (2002).

[Derenzo 2005] S. E. Derenzo, "Who needs better nuclear detector materials and how do we find them?" *Interdisciplinary Instrumentation Colloquium.* Berkeley: Ernest Orlando Lawrence Berkeley National Laboratory (2005).

[Finlayson 2006] C. E. Finlayson and P. J. A. Sazio, "Highly efficient blue photoluminescence from colloidal lead-iodide nanoparticles", *J. Phys. D-Appl. Phys.*, vol. 39 (#8), pp. 1477-1480 (2006).

[Kalk 1998] A. Kalk and M. Slaney, *Principles of Computerized Tomographic Imaging*, IEEE Press, New York 1988, p. 144.

[Klintenberg 2002] M. Klintenberg, S. E. Derenzo, and M. J. Weber, "Potential scintillators identified by electronic structure calculations", *Nucl. Instrum. Methods Phys. Res. Sect. A—Accel. Spectrom. Dect. Assoc. Equip.*, vol. 486 (#1-2), pp. 298-302 (2002).

[Klintenberg 2003] M. K. Klintenberg, M. J. Weber, and D. E. Derenzo, "Luminescence and scintillation of $PbI_2$ and $HgI_2$", *J. Lumines.*, vol. 102, pp. 287-290 (2003).

[Knoll 2000] G. Knoll, *Radiation Detection and Measurement*, John Wiley & Sons Inc., New York 2000, pp. 12-13.

[Kramer 2006] K. W. Kramer, P. Dorenbos, H. U. Gudel, C. W. E. van Eijk, "Development and characterization of highly efficient new cerium doped rare earth halide scintillator materials", *J. Mater. Chem.*, vol. 16 (#27), pp. 2773-2780 (2006).

[Létant 2006a] S. E. Létant and T.-F. Wang, "Study of porous glass doped with quantum dots or laser dyes under alpha irradiation", *Appl. Phys. Lett.*, vol. 88 (#10), Art. 103110, 8 Mar. 2006.

[Létant 2006b] S. E. Létant and T. F. Wang, "Semiconductor quantum dot scintillation under γ-ray irradiation", *Nano Lett.*, vol. 6 (#12), pp. 2877-2880, 13 Dec. 2006.

[Locock 2003] A. Locock and P. Burns, "The crystal structure of synthetic autunite, $Ca[(UO_2)(PO_4)]_2$ $(H_2O)_{11}$", *Am. Mineral.*, vol. 88, pp. 240-244 (2003).

[Matsunari 2007] I. Matsunari, M. Samuraki, W.-P. Chen, D. Yanase, N. Takeda, K: Ono, M. Yoshita, H. Matsuda, M. Yamada, and S. Kinuya, "Comparison of 18F-FDG PET and optimized voxel-based morphometry for detection of Alzheimer's disease: Aging effect on diagnostic performance", *J. Nucl. Med.*, vol. 48, pp. 1961-1970 (2007).

[McKigney 2007] E. A. McKigney, R. E. Del Sesto, L. G. Jacobsohn, P. A. Santi, R. E. Muenchausen, K. C. Ott, T. M. McCleskey, B. L. Bennett, J. F. Smith, and D. W. Cooke, "Nanocomposite scintillators for radiation detection and nuclear spectroscopy", *Nuclear Instruments & Methods in Physics Research Section A*, vol. 579 (#1), pp. 15-18, 21 Aug. 2007.

[Mutlugun 2007] E. Mutlugun, I. M. Soganci, and H. V. Demir, "Nanocrystal hybridized scintillators for enhanced detection and imaging on Si platforms in UV", *Opt. Express*, vol. 15 (#3), pp. 1128-1134, 5 Feb. 2007.

[Muzic 2006] R. Muzic and J. Kolthammer, "PET performance of the GEMINI TF: a time-of-flight PET/CT scanner", *IEEE Nucl. Sci. Symp. Conf. M*06-152, vol. 3, pp. 1940-1944 (2006).

[O'Brien 2001] T. O'Brien, R. Hicks, R. Ware, D. Binns, M. Murphy, and J. Cook, "The Utility of a 3-dimensional, large-field-of-view, sodium iodide crystal-based PET scanner in the presurgical evaluation of partial epilepsy", *J. Nucl. Med.*, vol. 42, pp. 1158-1165 (2001).

[Papavassiliou 1997] G. C. Papavassiliou, "Three- and low-dimensional inorganic semiconductors", *Prog. Solid State Chem.*, vol. 25 (#3-4), pp. 125-270 (1997).

[Pidol 2004] L. Pidol, B. Khan-harari, B. Ciana, E. Virey, B. Ferrand, P. Dorenbos, J. T. M. de Haas, and C. W. E. van Eijk, "High efficiency of lutetium silicate scintillators, Ce-doped LPS, and LYSO crystals", *IEEE Trans. Nuc. Sci.*, vol. 51 (#3), pp. 1084-1087 (2004).

[Porres 2006] L. Porres, A. Holland, L. O. Palsson, A. P. Monkman, C. Kemp, and A. Beeby, "Absolute measurements of photoluminescence quantum yields of solutions using an integrating sphere", *J. Fluoresc.*, vol. 16 (#2), pp. 267-272 (2006).

[Surti 2007] S. Surti, A. Kuhn, M. Werner, A. Perkins, J. Kolthammer, and J. Karp, "Performance of Philips Gemini TF PET/CT scanner with special considerations for its time-of-flight imaging capabilities", *J. Nucl. Med.*, vol. 48 (#3), pp. 471-480 (2007).

[van Loef 2001] E. V. D. van Loef, P. Dorenbos, C. W. E. van Eijk, K. Kramer, and H. U. Gudel, "High-energy-resolution scintillator: $Ce^{3+}$ activated $LaBr_3$", *Appl. Phys. Lett.*, vol. 79(#10), pp. 1573-1575 (2001).

[Wang 2007] Z. Wang, J. Bo, S. Song, L. Hu, J. Liu, and X. Zhen, "One-step synthesis of highly water-soluble $LaF_3$: $Ln^{3+}$ nanocrystals in methanol without using any ligands", *Nanotechnology* 18 (#46), 465-476 (2007).

[Weber 2002] M. J. Weber, "Inorganic scintillators: Today and tomorrow", *J. Lumines.*, vol. 100(#1-4), pp. 35-45 (2002).

[Wong 1983] W.-H. Wong, A. Mullani, E. Phillippe, R. Hartz, and K. Gould, "Image improvements and design optimization of the time-of-flight PET", *J. Nucl. Med.*, vol. 24, pp. 52-60 (1983).

[Xu 1993] Z. Y. Xu, S. R. Jin, C. P. Luo, and J. Z. Xu, "Well width dependence of the exciton lifetime in narrow GaAs/GaAlAs quantum-wells", *Solid State Commun.*, vol. 87 (#9), pp. 797-800 (1993).

We claim:

1. A radiation detection method comprising exposing a heterogeneous scintillator material to ionizing radiation, wherein heterogeneous scintillator material comprises:
   one or more core/shell nanoparticles comprising:
      a highly hygroscopic or deliquescent halide-based core activated by inclusion of Ln ions, wherein Ln is one or more of La, Ce, Pr, Nd, Pm, Sm, Eu, Gd, Tb, Dy, Ho, Er, Tm, Yb, and Lu; and
      a stable non-hygroscopic inorganic shell on the core with a bandgap of the shell being higher than that of the core; and
   detecting scintillation from the heterogeneous scintillator material.

2. The radiation detection method of claim 1 wherein the core is activated with trivalent $Ln^{3+}$ and/or divalent $Ln^{2+}$ lanthanide ions.

3. The radiation detection method of claim 1 wherein the nanoparticle core has a particle dimension of 2 to 100 nm.

4. The radiation detection method of claim 1 wherein the core comprises a lanthanide halide nanoparticle or an alkaline earth halide nanoparticle activated with lanthanide ions.

5. The radiation detection method of claim 4 wherein the lanthanide halide nanoparticle is selected from the group consisting of $LaBr_3$ and $LuI_3$ activated with lanthanide ions.

6. The radiation detection method of claim 5 wherein the shell is $LaF_3$.

7. The radiation detection method of claim 4 wherein the alkaline earth halide nanoparticle is selected from the group consisting of $SrI_2$ and $BaI_2$ doped with lanthanide ions.

8. The radiation detection method of claim 7 wherein the shell is $SrF_2$ or $BaF_2$.

9. The radiation detection method of claim 1 wherein the one or more core/shell nanoparticles are disposed in a matrix.

* * * * *